United States Patent [19]

Uto et al.

[11] 4,194,672

[45] Mar. 25, 1980

[54] PROCESS FOR THE DIFFUSION WELDING OF COPPER AND STAINLESS STEEL

[75] Inventors: Yoshimitsu Uto; Takashi Omae; Yasuhiro Fukaya; Yasuyuki Yoshida, all of Hiroshima, Japan

[73] Assignee: Mitsubishi Jukogyo Kabushiki Kaisha, Tokyo, Japan

[21] Appl. No.: 939,119

[22] Filed: Sep. 5, 1978

[30] Foreign Application Priority Data

Sep. 5, 1977 [JP] Japan ................... 52-105925

[51] Int. Cl.² .............................................. B23K 19/00
[52] U.S. Cl. ................................. 228/194; 228/238; 228/234
[58] Field of Search ............... 228/194, 195, 238, 234, 228/263

[56] References Cited

U.S. PATENT DOCUMENTS

3,108,861  10/1963  Cape et al. ................... 228/194 X

OTHER PUBLICATIONS

Peaslee, *Welding Journal*, Aug. 1976, pp. 59–60s.
Hoffman et al., *Welding Journal*, Apr. 1962, pp. 162s–166s.

*Primary Examiner*—Francis S. Husar
*Assistant Examiner*—K. J. Ramsey
*Attorney, Agent, or Firm*—Holman & Stern

[57] ABSTRACT

A process for the diffusion welding of copper and stainless steel, which comprises sandwiching a thin layer of at least one metal selected from the group consisting of Ni, Ni-base alloys, Cr, Ni-Cr, and Cr-Ni with little gas contents, as an insert metal, between the surfaces of copper and stainless steel to be bonded, and then diffusion welding the sandwich.

14 Claims, 5 Drawing Figures

(A)

(B)

(A)

(B)

PROCESS FOR THE DIFFUSION WELDING OF COPPER AND STAINLESS STEEL

BACKGROUND OF THE INVENTION

This invention relates to improvements in the process for the diffusion welding of copper and stainless steel having corrosion resistance, and more specifically to means for providing a copper-stainless steel clad plates of practical value by use of an insert metal.

Generally, parts of chemical apparatus often use copper-stainless steel clad plates, and those plates are made typically by explosive bonding and roll cladding techniques.

As for means for obtaining thin metal coatings, usually electrolytic plating, hot dipped plating, metal spraying, vacuum vapor deposited coating, and other similar methods are known. However, stainless steels, which are excellently corrosion-resistant alloy steels, cannot be melted to a suitable plating bath and thus fail to lend themselves easily to electrolytic plating. Moreover, because of their higher melting points than copper, stainless steels cannot be used in hot dipped plating. Difficulties are also involved in metal spraying and vacuum vapor deposited coating with the steels.

Diffusion welding is a process in which the objects to be joined together are heated to a temperature approximately above their recrystallization points and are bonded in a solid phase with the application of a pressure. In joining copper and stainless steel, diffusion welding is not in practical use yet because of the inability of attaining adequate bonding strength due, for example, to (1) formation of a hardened, brittle compound layer, (2) "brass cracking" as a result of the diffusion of copper into grain boundaries of stainless steel, and (3) separation and buildup of impurity oxygen out of copper into the interface of bond (which can result in a gas pressure high enough to force the joined surfaces apart), as will be described in the examples to be given later.

Table 1 summarizes the results of experiments in which copper and stainless steel were bonded by ordinary diffusion welding. In the process, copper (tough pitch copper) and stainless steel (SUS 304) were joined in a vacuum atmosphere of $10^{-4}$ torr under varied conditions.

Table 1

| Exp. No. | Welding temp. | Pressure | Welding time | Bonding strength* |
|---|---|---|---|---|
| 1 | 400° C. | 0.1–5 kg/mm² | 1–120 min. | 1–2 kg/mm² |
| 2 | 800 | " | " | 3–4 |
| 3 | 900 | " | " | 3–5 |
| 4 | 950 | " | " | 3–6 |
| 5 | >1000 | " | " | 5–7 serious deform. |

*in conformity with the ASTM shearing strength test procedure.

As can be seen from Table 1, the direct diffusion welding of copper and stainless steel will produce a bonding strength, or a shearing strength as determined by the ASTM procedure, of at most about 7 kg/mm². The shearing strength (8.4 kg/mm²) required of the clad plate by the ASTM standards is never attained.

As stated, diffusion welding is a process in which the pieces to be joined together are heated upwards of their recrystallization points, and welding is allowed to proceed with the application of a pressure from a fraction to several kilograms per square millimeter. Because the recrystallization point of copper is about 220° C. and that of stainless steel about 400° C., the test data given in Table 1 may be construed to have covered substantially the whole ranges of practical conditions for diffusion welding of copper and stainless steel. The results indicate that at low welding temperatures adequate atomic diffusion does not occur and the resulting weld lacks strength, and at high welding temperatures the abovementioned phenomena (1) to (3) take place and again the weld cannot have satisfactory strength.

FIG. 1 is a microphotograph of the diffusion-welded joint formed (at a welding temperature of 950° C. and at a pressure of 0.5 kg/mm² applied for 60 minutes) in Experiment No. 5 of Table 1. In the photograph the symbol α indicates copper: β, stainless steel: γ, an alloy layer; and 1, solder brittleness that resulted from the invasion of copper into the grain boundaries of stainless steel.

FIG. 2 is a graphic representation of the hardness distribution ($H_v$) in the diffusion-welded joint shown in FIG. 1. Throughout the two figures like symbols are used to designate like portions of the joint.

FIG. 3 graphically illustrates the separation of impurity oxygen from copper in the diffusion-welded joint made (at a welding temperature of 800° C. and a pressure of 1.0 kg/mm² applied for 60 minutes) in Experiment 2 of Table 1. This figure again uses the symbols in common with FIG. 1.

The present invention has for its object to provide a practical process for the diffusion welding of copper and stainless steel, which overcomes all of the aforedescribed disadvantages of the conventional processes by interposing a suitable insert metal between the surfaces of the copper and stainless steel to be united.

The use of an insert metal is itself a practice not uncommon in the art of diffusion welding. The technique is known, for example, from U.S. Pat. No. 3,530,568 to William A. Owczarski, et al. (issued Sept. 29, 1970). The U.S. patent teaches that, in diffusion welding of Ni alloys containing not less than 6% Al and Ti, a Ni alloy with a 50% or less Co content is employed as an insert metal. Generally, however, the type of suitable insert metal should vary with different materials and different combinations of dissimilar materials to be welded. For example, the insert metal disclosed by the U.S. patent is good only for the particular combination of the particular materials. The present invention is directed to an insert metal for the diffusion welding of stainless steel and copper and also for the conditions for the welding operation, which are both novel without any precedent in the art.

SUMMARY OF THE INVENTION

The present invention is concerned with improvements in the diffusion welding process for integrally bonding copper and stainless steel. More particularly, the invention aims at providing a novel process capable of fabricating a clad plate having adequate bonding strength and desirable physical properties, through the use of a selected insert metal. The invention thus concerns a process for integrally bonding the copper and stainless steel, which comprises interposing a thin layer of at least one metal selected from the group consisting of Ni, Ni-base alloys, and Cr which have little gas contents as an insert metal between the surfaces of copper and stainless steel, and then subjecting the sandwich to diffusion welding.

The clad plate thus formed in accordance with the invention is a composite material which combines the high electrical and thermal conductivities of copper with the excellent corrosion resistance and mechanical strength of stainless steel, and the product with by far the better properties than the copper or stainless steel alone has diversified applications.

The effects of the use of an insert metal according to the invention upon the thermal conductivity and specific resistance of the resulting clad plate will now be discussed. Table 2 gives the property values of metals for cladding and insertion.

Table 2

| Properties of cladding metals and insert metals | | Thermal conductivity (cal/cm/sec/°C.) | Specific resistance ($\mu\Omega$ . cm) |
|---|---|---|---|
| Cladding metals | Copper | 0.943 | 1.692 |
| | Stainless steels | | |
| | austenitic | 0.039 | 72.0 |
| | ferritic | 0.063 | 60.0 |
| | martensitic | 0.059 | 55.0 |
| Insert metals | Cr | 0.16 | 12.8 |
| | Ni | 0.215 | 7.8 |

As clearly shown in Table 3, the insert metals to be used in conformity with the invention are not inferior to stainless steels in both thermal conductivity and specific resistance. Therefore, the presence of an insert metal according to the invention will not adversely affect the fundamental properties of the copper-stainless steel clad plate.

DESCRIPTION OF THE PREFERRED EMBODIMENTS

Figure 1:
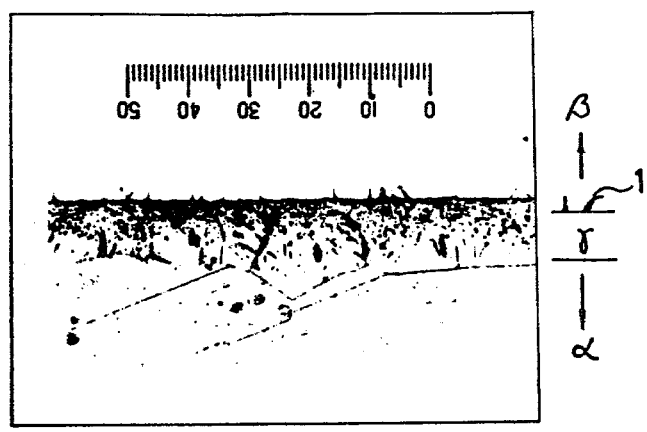
FIG. 1 is a microphotograph of a diffusion-welded joint formed by an ordinary diffusion welding process.
Figure 2:
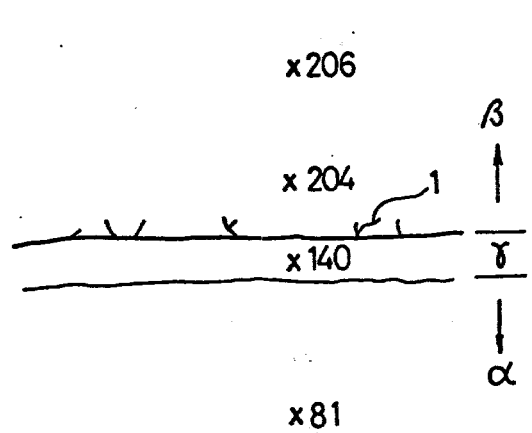
FIG. 2 is a graphic representation of the hardness distribution in the diffusion-welded joint of FIG. 1.
Figure 3:
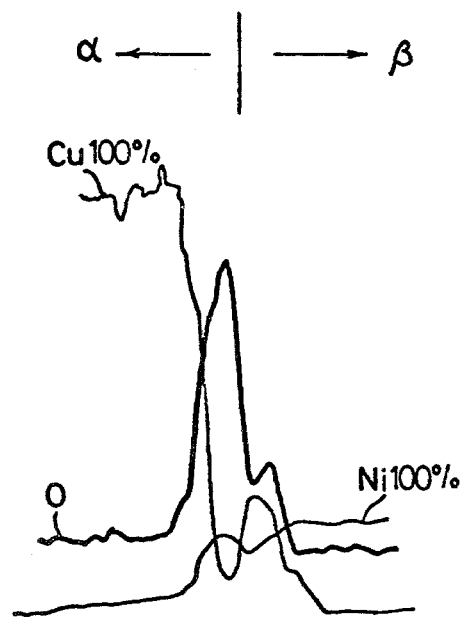
FIG. 3 is a graphic representation of the separation of impurity oxygen in copper.

The present invention is preferably embodied in the following ways:

(1) Either surface of copper or stainless steel to be bonded is thinly plated with Ni or Cr, and the plated surface is superposed with the other metal so that the two surfaces are held in contact, and then the two metals are diffusion welded in usual manner, with the thin plating layer utilized as an insert metal.

(2) The both surfaces of copper and stainless steel to be welded are thinly plated with Ni or Cr, and the two metals are superposed so that the both plated surfaces are in contact, and then, using the thin plated layers as an insert, the two metals are conventionally welded.

(3) A thin plating layer of Ni or Cr is formed on either surface of copper or stainless steel to be joined, the plated surface is further plated with Cr or Ni, and then the other metal is placed on the double plated metal and welded by a usual method, using the two different plating layers as an insert.

(4) At least either surface of copper or stainless steel to be bonded is thinly plated with Cr, and a Ni foil or a Ni-base alloy foil is interposed as an insert metal between the plated and unplated surfaces, and then welding is performed in the usual way.

(5) A Ni or Ni-base alloy foil is inserted between copper and stainless steel surfaces, and then the sandwich is diffusion welded by an ordinary method.

For the purposes of the invention, the thin layer of at least one metal selected from the group consisting of Ni, Ni-base alloys, Cr, Ni-Cr and Cr-Ni alloys with little gas contents is in the form of (i) a plating layer formed on the surface of a metal to be bonded, by electrolysis, vacuum evaporation, etc., or (ii) a foil formed by vacuum melting, or by air melting and their degassing treatment.

The diffusion welding process of the invention will be described in further detail below in terms of procedures as classified by the methods of metal insertion.

(a) Ni or Ni-base alloy insertion method

This method is intended for the Cu-Ni (or a Ni-base alloy)-stainless steel bonding. The Ni or Ni-base alloy to be used as the insert metal may be a little-oxygen-containing Ni foil formed by vacuum melting, inconel foil, or Monel metal foil. As an alternative, a layer of electrolytic Ni plating with a low oxygen content formed on a furface or an alloy plating layer with a high Ni content formed on the surface by vacuum evaporation may be utilized as an insert metal layer.

Advantages common to these insert materials are that Ni forms solid solutions with Cu and stainless steel, does not produce any brittle intermetallic compound, and prevents the brass cracking due to the intrusion of Cu into the grain boundaries of stainless steel. In addition, Ni forms a large volume of a solid solution with oxygen (with 0.07% $O_2$ at 600° C. and with 0.04% $O_2$ at 1200° C.), and it dissolves, and forms a solid solution with, the oxygen that separates out of copper into the interface so as to avoid gas generation and form a satisfactory joint. Especially, because the low-oxygen electrolytic Ni plating or vacuum-melted Ni foil is employed in the present invention, a large oxygen solid solution capacity is attained with a further improvement in effect, and a joint with outstanding properties is formed by diffusion welding at a temperature between 850° and 950° C.

A Ni-base alloy, also in the form of the foil or plating layer, will form solid solutions with Cu and stainless steel, afford no brittle intermetallic compound during the course of diffusion welding, and produce no passive state film in the air. Hence it proves as effective as Ni.

(b) Cr insertion method

This method is directed to the Cu-Cr-stainless steel bonding. As the insert metal, a Cr plating layer formed on either of the surfaces to be joined is used. The plating layer is employed because Cr usually is not readily stretched to a foil. Cr forms solid solutions with Cu and stainless steel and produces no brittle intermetallic compound, and the presence of the Cr layer provides a barrier against the intrusion of Cu into the grain boundaries of stainless steel. Hence it gives a satisfactory joint. In addition, Cr which is a powerful captivator of oxygen takes in the oxygen that comes out of copper into the bond interface, by a reaction

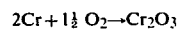

and thereby avoids the generation of a gas pressure and gives a desirable joint. Particularly because a plating layer of low-oxygen electrolytic Cr is employed in accordance with the invention, the great oxygen-capturing capacity of the insert metal is fully displayed, and excellent joint properties are obtained by diffusion welding at a temperature in the range of 850°–950° C.

(c) Cr-Ni or (c') Ni-Cr insertion method

This is directed to the Cu-Cr-Ni-stainless steel or Cu-Ni-Cr-stainless steel bonding. (As mentioned above, the Cr-Ni or Ni-Cr insertion method is named after the order of metal layers as alternatively arranged from the Cu surface onward). Each metal as the insert is in the form of a plating layer. A Ni foil may also be used. Both Cr and Ni form solid solutions with copper and stainless steel and give no brittle intermetallic compound. Prevention of brass cracking and gas solid solution are achieved as satisfactorily as by the preceding methods (a) and (b).

Since one of the metals to be diffusion welded by the process of the invention employing the afore-described insert metals is copper which has an affinity for rapid oxidation, the welding is desirably performed in an atmosphere of an inert gas, such as Ar or He, or in a vacuum. The types of stainless steels to which the process of the invention is applicable include austenitic, ferritic, and martensitic steels.

The invention will now be more fully described in connection with examples thereof.

EXAMPLES

Copper (tough pitch copper) and stainless steel (SUS 304) were diffusion welded in a vacuum atmosphere of $10^{-4}$ torr, using the varied insert metals described above. The results are summarized in Table 3.

A microphotograph of the diffusion-welded joint obtained by the procedure (1) of the Ni insertion method (a) given as an example of the invention in Table 3, using a welding temperature of 950° C., a pressure of 0.5 kg/mm$^2$, and a welding time of 60 minutes, is shown in FIG. 4(A), and the hardness distribution ($H_v$) in the joint is indicated in FIG. 4(B). Also, a microphotograph of the diffusion-welded joint obtained by the procedure (1) of the Cr insertion method (b) in Table 3, under the conditions of a welding temperature of 950° C., a pressure of 0.5 kg/mm$^2$, and a welding time of 60 minutes, is shown in FIG. 5(A), and the hardness distribution ($H_v$) in the joint is indicated in FIG. 5(B). In the both figures, the symbol $\alpha$ is tough pitch copper, $\beta$ is stainless steel, SUS 304 grade, $\delta_1$ is nickel, and $\delta_2$ is Cr.

Table 3

| Method | | Insertion procedure | Insert thickness (per layer) | Pressure applied | Bonding time | Bonding temp. | Bonding strength* | Brass cracking |
|---|---|---|---|---|---|---|---|---|
| (a) | Ni insertion method | (1) Cu plated with Ni and welded to SS. | 10, 50, or 100 (μ) | 0.1, 2.5, 5 (kg/mm$^2$) | 1–120 (min.) | 850° C. | 19–22 kg/mm$^2$ (Cu rupture) | None |
| | | (2) SS plated with Ni and welded to Cu. | | | | 900° C. | 20–23 kg/mm$^2$ (Cu rupture) | " |
| | | (3) Cu and SS welded with a vacuum-melted Ni foil in between. | | | | 950° C. | 21–23 kg/mm$^2$ (Cu rupture) | " |
| (b) | Cr insertion method | (1) Cu plated with Cr and welded to SS. | 10, 50, or 100 (μ) | 0.1, 2.5, 5 (kg/mm$^2$) | 1–120 (min.) | 850° C. | 18–20 kg/mm$^2$ (Cu rupture) | " |
| | | (2) SS plated with Cr and welded to Cu. | | | | 900° C. | 19–21 kg/mm$^2$ (Cu rupture) | " |
| | | | | | | 950° C. | 20–22 kg/mm$^2$ (Cu rupture) | " |
| (c) | Cr-Ni insertion method | (1) Cu plated with Cr, SS plated with Ni, and welded together. | 10, 50, or 100 (μ) | 0.1, 2.5, 5 (kg/mm$^2$) | 1–120 (min.) | 800° C. | 13–16 kg/mm$^2$ (insert rupture) | " |
| | | (2) Cu plated with Cr and then with Ni, and welded to SS. | | | | 850° C. | 19–20 kg/mm$^2$ (Cu rupture) | " |
| | | (3) SS plated with Ni and then with Cr, and welded to Cu. | | | | 900° C. | 20–21 kg/mm$^2$ (Cu rupture) | " |
| | | (4) Cr-plated Cu and SS welded with a vacuum-melted Ni foil in between. | | | | 950° C. | 20–22 kg/mm$^2$ (Cu rupture) | " |
| (c') | Ni-Cr insertion method | (1) Cu plated with Ni, SS plated with Cr, and welded together. | 10, 50, or 100 (μ) | 0.1, 2.5, 5 (kg/mm$^2$) | 1–120 (min.) | 800° C. | 13–16 kg/mm$^2$ (insert rupture) | " |
| | | (2) Cu plated with Ni and then with Cr, and welded to SS. | | | | 850° C. | 19–20 kg/mm$^2$ (Cu rupture) | " |
| | | (3) SS plated with Cr and then with Ni, and welded to Cu. | | | | 900° C. | 19–21 kg/mm$^2$ (Cu rupture) | " |
| | | (4) Cr-plated SS and Cu welded with a vacuum-melted Ni foil in between. | | | | 950° C. | 20–22 kg/mm$^2$ (Cu rupture) | " |

*in conformity with the ASTM shearing strength test procedure.

Typical examples in the examples of Table 3 will be described in detail below.

(1) Ni-plating insertion method

A Cu plate was electroplated with Ni to a plating thickness of 10μ under the following conditions:

| Electrolyte composition | |
|---|---|
| Nickel sulfamate | 275 g/l |
| Nickel chloride | 6 g/l |
| Boric acid | 35 g/l |
| pH | 4.5 |
| Temperature | 47° C. |
| Plating current | 2A/dm$^2$ |
| O$_2$ content of the plating | very small amount which cannot be detected |

The Cu plate was 20 mm thick, 100 mm wide, and 300 mm long, and the stainless steel (austenitic) plate was 2 mm thick, 100 mm wide, and 300 mm long. The Ni-plated Cu plate and the stainless steel plate were diffusion welded in a vacuum at a bonding temperature of 850° C. and a pressure of 2.5 kg/mm² for a period of 120 minutes. The strength properties of the resulting joint were determined in conformity with the ASTM shearing strength test procedure. The values were 19.0, 21.5, and 22.0 kg/mm². Thus, with a microstructure free of solder brittleness, a satisfactory clad plate was obtained.

(2) Ni-foil insertion method

A Cu plate and a stainless steel (austenitic) plate were diffusion welded with an air-melted and degassing treated Ni foil employed as an insert. The Ni foil used was 0.05 mm thick, and its $O_2$ content was 140 ppm. (The Ni melted in air had an $O_2$ content of 150–300 ppm, whereas the vacuum-melted Ni contained only 10–25 ppm $O_2$. The $O_2$ content of the air-melted Ni was decreased to 30–140 ppm upon a degassing treatment. The air-melted Ni foils showed poor bonding properties.)

The Cu plate was 15 mm thick, 150 mm wide, and 300 mm long, and the stainless steel (austenitic) plate was 1.5 mm thick, 150 mm wide, and 300 mm long. The two plates sandwiching the Ni foil in between were diffusion welded in a vacuum at a bonding temperature of 950° C. and a pressure of 2.5 kg/mm² for a period of 60 minutes. After the bonding, the joint strength was determined and values of 22.0, 22.5, and 22.8 kg/mm² were obtained by tests conducted in conformity with the ASTM shearing strength test procedure. A good clad plate with a microstructure free of solder brittleness resulted.

Moreover, the clad plate soldered by above condition using an air-melted Ni foils ($O_2$ content 18 ppm) as an insert metal showed the nearly same value as abovementioned joint strength and joint ability.

(3) Cr-plating insertion method

A Cu plate was electroplated with Cr to a plating thickness of 10µ under the following conditions:

| Electrolyte composition | |
| --- | --- |
| Chromic acid | 220 g/l |
| Sulfuric acid | 2.5 g/l |
| Temperature | 50° C. |
| Plating current | 30 A/dm² |
| $O_2$ content of the plating | 25 ppm or less |

The Cu plate was 20 mm thick, 100 mm wide, and 300 mm long, and the stainless steel (ferritic) plate was 1.5 mm thick, 100 mm wide, and 300 mm long. They were diffusion welded in a vacuum at a bonding temperature of 950° C. and a pressure of 0.5 kg/mm² for a period of 120 minutes. After the bonding, the joint strength was determined. Tests according to the ASTM shearing strength test procedure gave strength values of 20.0, 20.5, and 21.8 kg/mm². The clad plate thus obtained was satisfactory with a microstructure free of solder brittleness.

The insert metal is desirably more than 5µ in thickness, because an insert metal layer of about 1–3µ will be subjected to diffusion of Cu, Fe, and Cr atoms from the Cu and stainless steel, with consequent alloying and deterioration in strength and other physical properties.

There is no upper limit of the insert thickness. However, foils in commercial production usually are up to about 500µ in thickness, and an insert thickness exceeding 500µ will show unsatisfactory physical properties.

Figure 4:
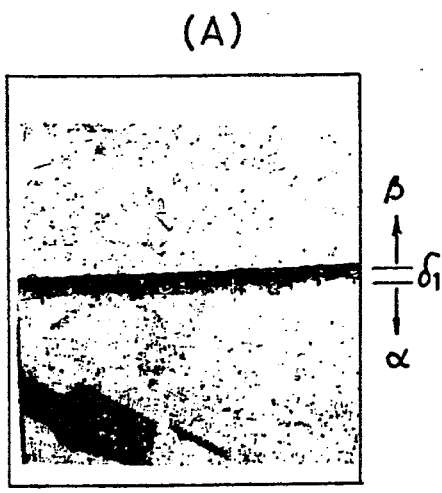
FIGS. 4(A), (B) and FIGS. 5(A), (B) are microphotographs (A) and graphs of hardness distribution (B) of diffusion-welded joints formed by the process of the invention.
Figure 4:
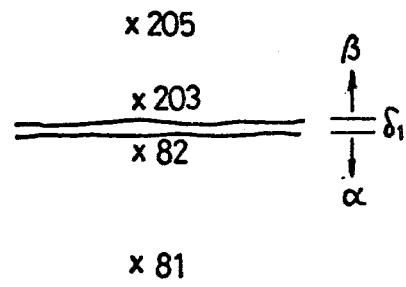
Figure 5:
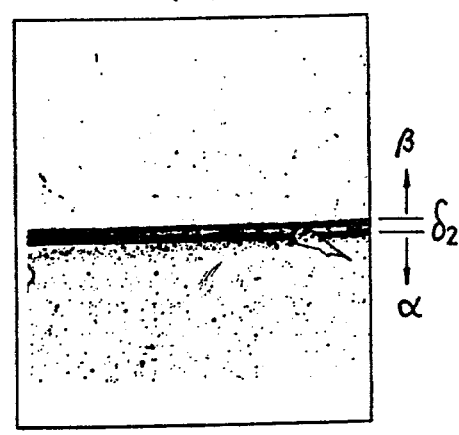
Figure 5:
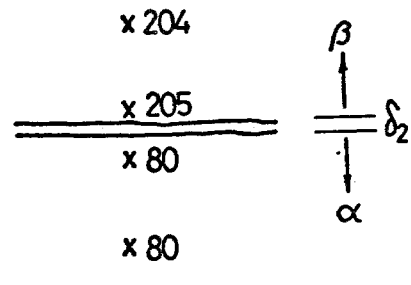

As will be understood from Table 3 and FIGS. 4 and 5, it has been found that welded joints with desirable properties are obtained without the formation of any brittle intermetallic compound or the occurrence of solder brittleness, and further without the slightest phenomenon of welded surface separation due to generation of a gas pressure.

It is also clear that the process of the invention is all the more effective on the tough pitch copper with a high oxygen content than on the oxygen-free or deoxidized copper.

What is claimed is:

1. A process for the diffusion welding of copper and stainless steel, which comprises the step of smoothening the surfaces of copper and stainless steel to be bonded together, cleaning the both surfaces until chemically active surfaces are exposed, and bringing either active surface into close contact with the mating stainless steel or copper surface smoothened and cleaned in advance, through a layer of insert metal which is at least one metal selected from the group consisting of Ni, Ni-base alloys, and Cr, said layer of insert metal containing not more than 140 ppm $O_2$ and ranging in thickness more than 5µ; and the step of bonding said copper, insert metal layer, and stainless steel altogether by diffusion welding in a vacuum or other non-oxidizing atmosphere at a temperature from 850° to 950° C.

2. A process as set forth in claim 1, wherein said copper is plated with Ni as said insert metal layer.

3. A process as set forth in claim 1, wherein a vacuum-melted Ni foil or Ni alloy foil is interposed as said insert metal layer.

4. A process as set forth in claim 1, wherein said copper is plated with Cr as said insert metal layer.

5. A process as set forth in claim 1, wherein said copper is plated with Cr and then with Ni to form a double plating as said insert metal layer.

6. A process as set forth in claim 1, wherein said copper is plated with Ni and then with Cr to form a double plating as said insert metal layer.

7. A process as set forth in claim 1, wherein said copper is plated with Cr and said stainless steel is plated with Ni, each as said insert metal layer.

8. A process as set forth in claim 1, wherein said copper is plated with Ni and said stainless steel is plated with Cr, each as said insert metal layer.

9. A process as set forth in claim 1, wherein said copper is plated with Cr as said insert metal layer, and a vacuum-melted Ni foil or Ni alloy foil is interposed as an additional insert metal layer between said Cr-plated copper and said stainless steel.

10. A process as set forth in claim 1, wherein said stainless steel is plated with Ni as said insert metal layer.

11. A process as set forth in claim 1, wherein said stainless steel is plated with Cr as said insert metal layer.

12. A process as set forth in claim 1, wherein said stainless steel is plated with Ni and then with Cr to form a double plating as said insert metal layer.

13. A process as set forth in claim 1, wherein said stainless steel is plated with Cr and then with Ni to form a double plating as said insert metal layer.

14. A process as set forth in claim 1, wherein said stainless steel is plated with Cr as said insert metal layer, and a vacuum-melted Ni foil or Ni alloy foil is interposed as an additional insert metal layer between said Cr-plated stainless steel and said copper.

* * * * *